United States Patent [19]

Candau et al.

[11] Patent Number: 5,093,009
[45] Date of Patent: Mar. 3, 1992

[54] PROCESS FOR PURIFYING WATER USING A POLYMER FLOCCULATING AGENT

[75] Inventors: Francoise Candau, Strasbourg; Pascale Buchert, Senlis; Marc Esch, Freyming Merlebach, all of France

[73] Assignee: Norsolor S.A., Paris la Defense, France

[21] Appl. No.: 458,495

[22] Filed: Dec. 28, 1989

[30] Foreign Application Priority Data

Dec. 28, 1988 [FR] France ................ 88 17306

[51] Int. Cl.$^5$ ................................. C02F 1/56
[52] U.S. Cl. ................... 210/734; 210/732; 524/831; 524/922
[58] Field of Search ........ 210/725, 727, 728, 732–734, 210/735; 523/337; 524/801, 922, 831

[56] References Cited

U.S. PATENT DOCUMENTS

| | | | |
|---|---|---|---|
| 3,790,476 | 2/1974 | Spoerle et al. | 210/734 |
| 3,996,180 | 12/1976 | Kane | 524/801 |
| 4,152,307 | 5/1979 | Shibahara et al. | 210/734 |
| 4,330,450 | 5/1982 | Lipowski et al. | 210/734 |
| 4,391,932 | 7/1983 | Tai | 523/337 |
| 4,454,047 | 6/1984 | Becker et al. | 210/734 |
| 4,588,508 | 5/1986 | Allenson et al. | 210/734 |
| 4,681,912 | 7/1987 | Durand et al. | 524/831 |
| 4,931,191 | 6/1990 | Braden et al. | 210/725 |
| 4,956,399 | 9/1990 | Kozakiewicz et al. | 524/831 |
| 4,968,438 | 11/1990 | Neff et al. | 210/734 |

FOREIGN PATENT DOCUMENTS

| | | | |
|---|---|---|---|
| PCT/US80/-01352 | 5/1981 | European Pat. Off. | |
| 0068955 | 1/1983 | European Pat. Off. | |
| 0202780 | 11/1986 | European Pat. Off. | |
| 2354006 | 5/1975 | Fed. Rep. of Germany | 524/801 |

*Primary Examiner*—Peter Hruskoci
*Attorney, Agent, or Firm*—Millen, White, & Zelano

[57] ABSTRACT

Process for the purifiying water using an effective proportion of a flocculating agent consisting of a reverse microlatex comprising a polymer of at least one water-soluble cationic vinyl monomer, which may be copolymerized with at least one water-soluble anionic or nonionic vinyl monomer, possessing a molecular weight at least equal to $2 \times 10^6$.

The said microlatex is in the form of particles of a microlatex having a diameter of between 30 and 160 nm and its polydispersity index is between 1.05 and 1.2.

9 Claims, No Drawings

PROCESS FOR PURIFYING WATER USING A POLYMER FLOCCULATING AGENT

BACKGROUND OF THE INVENTION

The present invention relates to a process for purifying waste waters using a novel flocculating agent.

Processes for purifying waste waters using dispersions of water-soluble cationic polymers are already known. U.S. Pat. No. 3,409,547 describes, in particular, a process for purifying water using 0.1 to 10 ppm of a quaternary ammonium polymer such as that derived from dimethylaminoethyl methacrylate. European Patent No. 068,955 describes water-in-oil dispersions, which are stable for more than 4 months at 20°–25° C., comprising:

from 20% to 55% of a polymer based on quaternized dimethylaminoethyl acrylate, in the pure form or as a mixture with acrylamide,
from 20% to 45% of at least one $C_{10}$–$C_{13}$ normal alkane,
from 1% to 5% of a system comprising at least two emulsifying agents, one of which has a HLB (hydrophilic-lipophilic balance) of 3 to 5 and the other has a HLB of 12 to 16, and
water to make up to 100%.

These dispersions, which are suitable as flocculating agents for the clarification of waste waters, consist of particles generally between 200 and 2,000 nm in of and having a size polydispersity at least equal to 2.

U.S. Pat. No. 4,588,508 describes a mixture, used for the clarification of water, of two cationic polymers having a bimodal molecular weight distribution. British Patent No. 2,178,432 describes the use, for the flocculation of solids in suspension in water, of 1 to 10,000 ppm, relative to the said solids, of a mixture of a strongly cationic polymer and at least one weakly cationic polymer. The obvious drawback of the solutions proposed in these two latter documents lies in the complexity resulting from the preliminary formation of two different polymers.

SUMMARY OF THE INVENTION

The aim of the present invention is to resolve the abovementioned problems of the state of the art, that is to say to obtain a novel flocculating agent of simple composition, which is thermodynamically stable and is in the form of particles of very small dimensions and essentially monodisperse, possessing a high flocculating activity for the treatment of waste waters.

According to the present invention, a flocculating agent of this type consists of a reverse microlatex comprising a polymer of at least one water-soluble cationic vinyl monomer, which may be copolymerized with at least one water-soluble anionic or non-ionic vinyl monomer, possessing a molecular weight at least equal to $2 \times 10^6$, the said microlatex being characterized in that it is in the form of particles of between 30 and 160 nm in diameter and in that its polydispersity index (defined as the ratio of the weight-average diameter of the polymer particles to their number-average diameter) is between 1.05 and 1.2 approximately.

A flocculating agent of this type generally has the following properties:
thermodynamically stability for a period of 30 months or more,
optically transparency,
has Newtonian rheological characteristics up to volume fractions of dispersed phase (sum of the polymer swollen with water and of the surfactant) reaching about 55%,
has a limiting viscosity at a shear gradient of zero (determined at 25° C.) of between about 3 and 500 centipoises, according to the volume fraction of the dispersed phase.

The category of flocculating agents according to the invention can advantageously be prepared by a process comprising a first step (a) for the preparation of a reverse microemulsion (of the water-in-oil type) and a second step (b) in which the reverse microemulsion obtained in step (a) is subjected to polymerization conditions, characterized in that step (a) consists in mixing the following constituents:

(A) an aqueous solution of at least one water-soluble cationic vinyl monomer, which may be mixed with at least one water-soluble anionic or non-ionic vinyl monomer, (B) an oily phase comprising at least one liquid hydrocarbon, and (C) at least one non-ionic surfactant, in a proportion sufficient to obtain a reverse microemulsion, and having a HLB of:
either between 11 and 15 approximately when the water-soluble cationic vinyl monomer is either by itself or as a mixture with a water-soluble anionic vinyl monomer,
or between 7.5 and 13 approximately when the water-soluble cationic vinyl monomer is in a mixture with a water-soluble non-ionic vinyl monomer.

The concentration of the water-soluble cationic vinyl monomer in the aqueous solution (A) is generally between 5 and 80% by weight and preferably between 10 and 60% by weight.

The liquid hydrocarbon present in the oily phase (B) is preferably chosen from the linear, branched or cyclic aliphatic hydrocarbons having from 6 to 14 carbon atoms or from the aromatic hydrocarbons having from 6 to 15 carbon atoms.

To obtain 100 parts by weight of the reverse microemulsion according to the invention the following are preferably mixed:
from 25 to 65 parts by weight of the aqueous solution (A),
from 25 to 60 parts by weight of the oily phase (B), and
from 10 to 27 parts by weight of the non-ionic surfactant (C).

Examples of non-ionic surfactants which can be used according to the present invention are, in particular, polyoxyethylenated sorbitol hexaoleate, sorbitan sesquioleate, ethoxylated sorbitan trioleate, sorbitan trioleate and polyoxyethylenated sorbitol monooleate as well as the copolymers comprising at least two polymer components derived from liposoluble complex monocarboxylic acids and another polymer component which is a residue of a water-soluble compound containing polyoxyalkylene units, the said copolymers being such as those described in the European Patent Application published under No. 0,258,120, or their mixtures.

Water-soluble cationic vinyl monomers which fall within the scope of the present invention are, in particular, unsaturated quaternary ammonium salts corresponding to the general formula:

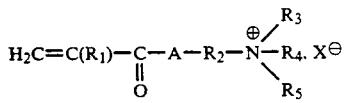

in which:
A is an oxygen atom or a NH group,
$R_1$ is a linear or branched alkyl radical having from
$R_2$ is a linear or branched alkyl radical having from 2 to 4 carbon atoms,
$R_3$, $R_4$ and $R_5$, which may be identical or different, are linear or branched alkyl radicals or aryl radicals, and
X is chosen from halogen atoms and the groups $-C_2H_5-SO_4$ and $-CH_3-SO_4$.

A more particularly preferred quaternary ammonium salt for the composition of a flocculating agent according to the invention is methacryloyloxyethyltrimethylammonium chloride.

The following may be mentioned in particular as water-soluble anionic vinyl monomers which can be used according to the present invention: acrylic acid, methacrylic acid and 2-acrylamido-2-methylpropanesulphonic acid and in particular their alkali metal salts. The following may be mentioned in particular as water-soluble, non-ionic vinyl monomers which can be used according to the present invention: acrylamide, methacrylamide and N-vinylpyrrolidone.

Within the scope of the present invention, the water-soluble cationic vinyl monomer can be mixed in all proportions with at least one water-soluble vinyl monomer which may be either anionic or non-ionic, as defined above. However, in such mixtures it is preferable that the proportion of the water-soluble cationic vinyl monomer is at least 5% by weight.

The proportion of non-ionic surfactant in the reverse microemulsion and the choice of the HLB of this surfactant are two factors which determine the efficiency of the process according to the invention. On the one hand, apart from exceptions linked to the particular nature of the water-soluble vinyl monomers used or to the particular nature of the oily phase, it will not generally be possible to obtain a (thermodynamically) stable reverse microemulsion when the proportion of surfactant in the mixture of constituents (A), (B) and (C) is less than 10% by weight. On the other hand, the choice of the HLB of the surfactant depends on the following four factors:
  polymerization of the water-soluble cationic vinyl monomer on its own or as a mixture with a comonomer,
  if the cationic monomer is mixed with a comonomer, the nature (anionic or non-ionic) and proportion of the latter,
  the nature of the cationic monomer, and
  the nature of the oily phase (B).

Moreover, it is known that in this type of process the amount of surfactant required depends on the HLB of the latter and generally passes through a minimum value when the HLB increases. Given that, for economic reasons, it is most often sought to minimize the use of surfactant, this minimum value will also constitute an industrial optimum. It is therefore very important that the HLB of the surfactant to be used is determined in each case, as a function of the factors enumerated above. To illustrate this aspect of the invention, the following examples can be given: thus, when methacryloyloxyethyltrimethylammonium chloride is homopolymerized, the oily phase being cyclohexane, it is preferable to use a non-ionic surfactant (or a mixture) having a HLB of between 12.8 and 13.2 approximately. When the methacryloyloxyethyltrimethylammonium chloride is copolymerized with acrylamide, the oily phase being cyclohexane, it is preferable to use a non-ionic surfactant (or a mixture) having a HLB of between 7.5 and 13 approximately, the said HLB preferably being correlated to the weight fraction x of the chloride in the mixture in accordance with the relationship:

$$4x + 7.3 \leq HLB \leq 5.5x + 7.7$$

Taking the above technical teaching into account, the determination of the HLB of the surfactant to be used for other monomers is within the scope of those skilled in the art.

During the preparation of the reverse microemulsion it is important that the temperature of the mixture is carefully controlled because of the temperature sensitivity of reverse microemulsions in the presence of non-ionic surfactants. This influence of the temperature is the more sensitive the closer the concentration of the surfactant to the minimum content required to obtain a reverse microemulsion. With a view to reducing the content of surfactant necessary and in order to reduce to a minimum the influence of the temperature on the stability of reverse microemulsions, the latter will as far as possible be prepared at a temperature which is as close as possible to that which would have been chosen for the polymerization.

In the course of the second step (b) of the process according to the invention, the reverse microemulsion prepared in the course of step (a) is subjected to:
  photochemical polymerization conditions, for example by ultraviolet irradiation, and/or
  thermal polymerization conditions, by bringing the microemulsion into the presence of a hydrophobic free-radical initiator (such as azo-bisisobutyronitrile) introduced with the oily phase (B) or a hydrophilic free-radical initiator (such as potassium persulphate or ammonium persulphate) introduced with the aqueous solution (A), or into the presence of a redox system in which the persulphate is used in combination with at least one reducing agent chosen from the polyhydrophenols, sodium sulphite and odium bisulphite, dimethylaminopropionitrile, the diazomercaptans and the ferricyanides.

The polymerization takes place rapidly and quantitatively and leads to the formation of stable and transparent microlatexes containing a high proportion of water-soluble (co)polymer. The polymerization time is, for example, from 5 to 260 minutes by the photochemical route at ambient temperature and from 5 to 360 minutes by the thermal route (the time being, of course, an inverse function of the temperature). The temperature which can be used in the course of a polymerization by the thermal route is generally between 20° and 90° C.

According to the present invention, the purification of water is effected by using an effective proportion of the flocculating agent described above, preferably 1 to 10,000 ppm, relative to the solids in suspension in the water to be purified. This proportion can, of course, depend, as is known to those skilled in the art, on the physical and chemical nature of the solids in suspension in the water and on the solids content in the water.

The purification process according to the invention enables the ecological problems of clarification and purification of sewage and aqueous industrial effluents to be resolved in a simple and efficient manner while using a flocculating agent capable of withstanding a prolonged period of storage (which can currently reach 30 months or more) and without necessitating the prior dissolution of a flocculating agent in powder form.

The examples below are given by way of illustration and do not limit the present invention.

EXAMPLE 1

37 g of cyclohexane and 13 g of a mixture (having a HLB of 12.9) of polyoxyethylenated sorbitan monooleate (TWEEN 80) and sorbitan sesquioleate (ARLACEL 83) are mixed, with stirring. In addition, 25 g of methacryloyloxyethyltrimethylammonium chloride are dissolved in 25 g of distilled water and this solution is then added to the mixture of cyclohexane and surfactant. The microemulsion thus obtained, into which 0.3% by weight of azo-bis-isobutyronitrile, relative to the monomer, are introduced, is degassed for 30 minutes at 20° C. under a nitrogen atmosphere in order to remove oxygen, which is capable of acting as an inhibitor.

The microemulsion is then irradiated under ultraviolet light in a 500 ml reactor, thermostat-controlled at 20° C. After polymerization for one hour, a clear microlatex is obtained having a molecular weight of the polymer of 10; and a polydispersity index (as defined above) of 1.15, the mean diameter of the particles being 138 nm.

EXAMPLE 2

The microlatex obtained according to Example 1 is used for the clarification of waste waters, containing 9 g of solid matter per liter, kept under mechanical stirring at about 700 revolutions per minute.

Having rapidly introduced the microlatex into the liquid in an amount of 6 g per kg of solid matter, stirring is stopped after 5 seconds. At the end of 25 minutes, it is observed that the height of the settled sludge is equal to 61% of the initial height of the treated sludge.

EXAMPLE 3 (comparative)

The sludge sedimentation test is carried out under the conditions of Example 2, replacing the microlatex of Example 1 by a cationic polymer latex in powder form marketed by the FLOERGER company under the name FO 9650 G. After 25 minutes' sedimentation the height of the settled sludge is still equal to 74% of the initial height of the treated sludge.

We claim:

1. In a process of purifying water containing suspended solids comprising adding a flocculating agent to the water and removing suspended solids therefrom, the improvement wherein the flocculating agent comprises a reverse microlatex comprising a polymer of methacryloyloxyethyltrimethylammonium chloride, optionally copolymerized with at least one water-soluble anionic or non-ionic vinyl monomer, said polymer possessing a molecular weight at least equal to $2 \times 10^6$, said microlatex being in the form of particles of a microlatex of between 30 and 160 nm in diameter and having a polydispersity index of between 1.05 and 1.2, wherein said polydispersity index is defined as the ratio of the weight-average diameter of the polymer particles to their number-average diameter.

2. A process according to claim 1, wherein the proportion of the microlatex is between 1 and 10,000 ppm relative to the solids in suspension in the water.

3. A process according to claim 1, wherein the microlatex has a limiting viscosity at a shear gradient of zero at 25° C. of between 3 and 500 centipoises.

4. A process according to claim 1, wherein at least 5% by weight of the monomer is a cationic monomer.

5. A process according to claim 1, wherein said polymer is a copolymer of an anionic monomer, said anionic monomer being acrylic acid, methacrylic acid, 2-acrylamidomethylpropanesulfonic acid, or an alkali metal salt thereof.

6. A process according to claim 1, wherein said polymer is a copolymer of a non-ionic monomer, said non-ionic monomer being acrylamide, methacrylamide, or N-vinylpyrrolidone.

7. In a process of purifying water containing suspended solids comprising adding a flocculating agent to the water and removing suspended solids therefrom, wherein the flocculating agent comprises a reverse microlatex comprising a polymer of methacryloyloxyethyltrimethylammonium chloride, optionally copolymerized with at lest one water-soluble anionic or non-ionic vinyl monomer, said polymer possessing a molecular weight of at least $2 \times 10^6$, said microlatex being in the form of particles of between 30 and 160 nanometers in diameter and having a polydispersity index of between 1.05 and 1.2, wherein said polydispersity index is defined as the ratio of the weight-average diameter of the polymer particles to their number-average diameter, wherein said microlatex has been prepared form a reverse microemulsion of a water-in-oil type comprising:
 (A) an aqueous solution of methacryloyloxyethyltrimethylammonium chloride, optionally mixed with at least one water-soluble anionic or non-ionic vinyl monomer,
 (B) an oily phase comprising at least one liquid hydrocarbon, and
 (C) at least one non-ionic surfactant, n a proportion sufficient to obtain a reverse microemulsion, and having an HLB of:
 between 11 and 15 approximately if methacryloyloxyethyltrimethylammonium chloride is either by itself or as a mixture with a water-soluble anionic vinyl monomer,
 or between 7.5 and 13 approximately if methacryloyloxyethyltrimethylammonium chloride is in a mixture with a water-soluble non-ionic vinyl monomer.

8. A process according to claim 7, wherein the reverse microemulsion comprises, per 100 parts by weight
 from 25 to 65 parts by weight of the aqueous solution (A),
 from 25 to 60 parts by weight of the oily phase (B), and
 from 10 to 27 parts by weight of the non-ionic surfactant (C).

9. In a process of purifying water containing suspended solids comprising adding a flocculating agent to the water and removing suspended solids therefrom, the improvement wherein the flocculating agent comprises a reverse microlatex comprising a polymer of consisting essentially of methacryloyloxyethyltrimethylammonium chloride having a molecular weight of at least $2 \times 10^6$, said microlatex being in the form of particles of between 30 and 160 nanometers in diameter and having a polydispersity index of between 1.05 and 1.2, wherein said polydispersity index is defined as the ratio of the weight average diameter of the polymer particles to their number average diameter.

* * * * *